(12) United States Patent
Fuyuki

(10) Patent No.: US 10,634,171 B2
(45) Date of Patent: Apr. 28, 2020

(54) ELASTIC TUBE FOR FLUID PRESSURE ACTUATOR AND ACTUATOR

(71) Applicant: FUYUKI ACADEMY, Sakurai-shi, Nara (JP)

(72) Inventor: Masanori Fuyuki, Kashiba (JP)

(73) Assignee: FUYUKI ACADEMY, Sakurai-Shi, Nara (JP)

( * ) Notice: Subject to any disclaimer, the term of this patent is extended or adjusted under 35 U.S.C. 154(b) by 0 days.

(21) Appl. No.: 16/100,820

(22) Filed: Aug. 10, 2018

(65) Prior Publication Data

US 2019/0040880 A1 Feb. 7, 2019

Related U.S. Application Data

(63) Continuation of application No. PCT/JP2017/005025, filed on Feb. 11, 2017.

(30) Foreign Application Priority Data

Feb. 14, 2016 (JP) .................................. 2016-025382
Feb. 7, 2017 (JP) .................................. 2017-020090

(51) Int. Cl.
*F15B 15/10* (2006.01)
*F16L 57/06* (2006.01)

(52) U.S. Cl.
CPC ............ *F15B 15/103* (2013.01); *F15B 15/10* (2013.01); *F16L 57/06* (2013.01)

(58) Field of Classification Search
CPC ......... F15B 15/103; F15B 15/10; B25J 9/142; B25J 9/1075; B25J 15/12; B25J 15/0023

USPC .......................................... 92/89, 90, 91, 92
See application file for complete search history.

(56) References Cited

U.S. PATENT DOCUMENTS

| 3,194,702 | A | * | 7/1965 | Geller | F16C 33/14 |
| | | | | | 156/154 |
| 4,615,260 | A | * | 10/1986 | Takagi | B25J 9/142 |
| | | | | | 901/22 |
| 5,185,402 | A | * | 2/1993 | Fleming | C08G 18/12 |
| | | | | | 525/130 |
| 7,299,741 | B2 | * | 11/2007 | Hiramatsu | A61H 1/0237 |
| | | | | | 601/5 |

(Continued)

FOREIGN PATENT DOCUMENTS

| JP | H01-206029 A | 8/1989 |
| JP | H05-27444 U | 4/1993 |

(Continued)

*Primary Examiner* — Michael Leslie
*Assistant Examiner* — Dustin T Nguyen
(74) *Attorney, Agent, or Firm* — Rabin & Berdo, P.C.

(57) ABSTRACT

In an elastic tube as a driving force source of a fluid pressure actuator that is driven by supplying and discharging fluid such as air or liquid, a wear-resistant flocked layer is provided on an entire outer circumferential surface of the elastic tube, and the wear-resistant flocked layer being formed by an electrostatic flocking process in which short fibers made of synthetic resin are flocked to be perpendicular to the outer circumferential surface, and the wear-resistant flocked layer being further formed by the electrostatic flocking process in which the short fibers made of the synthetic fiber are flocked in a number of strips along an axial direction or in a number of dots on the entire outer circumferential surface.

10 Claims, 17 Drawing Sheets

(56) References Cited

U.S. PATENT DOCUMENTS

| | | | | |
|---|---|---|---|---|
| 7,897,236 B2* | 3/2011 | Merovitz | ........... | A41D 19/0058 2/159 |
| 2005/0053758 A1* | 3/2005 | Smith | ..................... | A46B 3/02 428/90 |
| 2009/0035515 A1* | 2/2009 | Cecconi | ................ | A61F 13/512 428/137 |
| 2013/0330502 A1* | 12/2013 | Lewis | ....................... | B32B 5/12 428/90 |
| 2017/0297247 A1* | 10/2017 | Sugahara | .............. | B29C 48/154 |

FOREIGN PATENT DOCUMENTS

| | | |
|---|---|---|
| JP | H09-229127 A | 9/1997 |
| JP | 2006-034461 A | 2/2006 |
| JP | 2010-127429 A | 6/2010 |
| JP | 2015-108436 A | 6/2015 |
| JP | 2015-180829 A | 10/2015 |
| WO | WO-2004/085856 A1 | 10/2004 |

* cited by examiner

ELASTIC TUBE FOR FLUID PRESSURE ACTUATOR AND ACTUATOR

CROSS REFERENCE TO RELATED APPLICATIONS

This application is a continuation under 35 U.S.C. 120 of International Application PCT/JP2017/005025 having the International Filing Date of Feb. 11, 2017, and having the benefit of the earlier filing date of Japanese Applications No. 2016-025382, filed on Feb. 14, 2016, and No. 2017-020090, filed on Feb. 7, 2017. Each of the identified applications is fully incorporated herein by reference.

BACKGROUND OF THE INVENTION

Technical Field

The present invention relates to an elastic tube that is used for a fluid pressure actuator driven by supplying and discharging fluid such as air or liquid, and a fluid pressure actuator using the elastic tube, more specifically, a McKibben fluid pressure actuator.

Background Art

A McKibben fluid pressure actuator, which is one of so-called actuators (drive devices), as illustrated FIGS. 1 to 3, has a structure in which a cylindrical elastic sleeve S made of a synthetic resin fiber woven in a spiral mesh pattern covers an outer circumferential surface of an elastic tube G made of natural rubber or urethane rubber; a pair of terminal portions T each provided with a fluid sucking and discharging mechanism for sucking and discharging the fluid such as air or liquid are fixed at both ends thereof to seal them; and the elastic tube G is expanded with air pressure applied from the outside to contract the entire length of the actuator. As illustrated in FIG. 4, the sleeve S has a structure in which angles of the mesh changes in an accordion manner, so that the radius is increased when pushed inwardly in an axial direction, while the radius is reduced when pulled outwardly in the axial direction, and operates, in principle, such that when the elastic tube G incorporated therein is attempted to be axially and radially expanded with the air pressure applied thereto, the sleeve S generates an axial shrinkage force acting on the elastic tube G by changing the angles of the mesh in response to the radial expansion.

The fluid pressure actuator has advantages such as lighter weight and higher power density (large power can be output with small self-weight), more superior environmental resistance (high resistance to rust and dust), simpler structure and easier maintenance, having the characteristics close to the human muscle characteristics with high flexibility, and lower manufacturing cost, as compared with an electromagnetic actuator or a hydraulic cylinder actuator, while has a disadvantage that the surface of the elastic tube is necessarily damaged or worn out to cause holes or tears resulting from friction with the sleeve due to the structure of the actuator, resulting in low durability.

To solve the above problems, the prior arts disclosed in Patent Documents 1 to 3 are proposed. In the invention disclosed in Patent Document 1, an elastic tube contains short fibers such as carbon fibers, or glass fibers aligned in a longitudinal direction to increase the wear resistance of the material itself of the elastic tube, and the expanding/contracting direction of the elastic tube is controlled to increase the durability. In the invention disclosed in Patent Document 2, an elastic tube has a double structure such that wears and tears in the outer tube do not propagate the inner tube, to increase the durability. Furthermore, in the invention disclosed in Patent Document 3, a low friction member having expanding and contracting properties is arranged between an elastic tube and a sleeve to decrease the friction therebetween.

CITATION LIST

Patent Document 1: Japanese Patent Laid-Open No. 2015-180829
Patent Document 2: Japanese Patent Laid-Open No. 2015-108436
Patent Document 3: National Publication of International Patent Application No. 2004-085856

SUMMARY

However, when short fibers are contained in the material itself of the elastic tube as disclosed in the invention of Patent Document 1, the elasticity of the material of the rubber or the like necessarily changes, and the output characteristics of the actuator also change. Therefore, a dedicated specification is needed for the material of the elastic tube. In addition, the double structure of an elastic tube and the configuration in which a low friction member is arranged between an elastic tube and a sleeve as disclosed in the inventions of Patent Documents 2 and 3 should result in complicated structures. Accordingly, all of these prior arts would reduce the advantage of inexpensive manufacturing cost of the fluid pressure actuator.

The present invention has been made to solve the above problems of the prior arts, and has an object to provide an elastic tube for a fluid pressure actuator and the fluid pressure actuator in which a conventional elastic tube is subjected to minimal processing to increase the wear resistance of an outer circumferential surface of the elastic tube, and the advantageous characteristics of the actuator having a simple structure and being lightweight are maintained while being inexpensive and highly durable.

To solve the above-described problems, the invention according to claim 1 of the present application discloses an elastic tube as a driving force source of a fluid pressure actuator that is driven by supplying and discharging fluid such as air or liquid, in which a wear-resistant flocked layer is provided on an entire outer circumferential surface of the elastic tube, and the wear-resistant flocked layer being formed by an electrostatic flocking process in which short fibers made of synthetic resin are flocked to be perpendicular to the outer circumferential surface.

In the present invention, the short fibers made of synthetic resin are preferably nylon fibers with high elastic restoring force, but are not limited thereto, and may be synthetic fibers with high wear resistance. In the electrostatic flocking process, a workpiece (object to be flocked) whose surface is coated in advance with an adhesive is placed in an electrostatic flocking device, and short fibers introduced in the electrostatic flocking device pass through an electric field formed by applying a high voltage so as to be aligned parallel to a direction of the electric field while jumping by means of an electrostatic attraction force, resulting in the short fibers being densely crowded and bonded on the adhesive-coated surface of the workpiece so as to be perpendicular to the adhesive-coated surface. The electrostatic flocking process is a well-known technique which is widely used in the field of the surface processing of a metallic heat source cover of a Kotatsu (a Japanese table heater) as an old example, members of various mechanical devices, articles for daily use, and the like, and which has been used to improve the heat insulation, the acoustical insulation, and the impact resistance, and to improve the feature such as texture.

Since the flocked layer formed by electrostatic flocking process has a high elasticity, the flocked layer is used to modify a rubber surface, and is frequently used for various interior members such as rubber parts of automobiles, articles for daily use, and the like. The objects of the electrostatic flocking process are to improve the smoothness of member operation due to the friction reduction effect, the acoustical insulation, the air-tightness, the texture, and the like. For example, the electrostatic flocking process on rubber packing of automobiles is performed to prevent chattering and improve the smoothness of moving up and down of the window glass due to the friction reduction effect. The kitchen rubber glove product whose inside is subjected to the electrostatic flocking process is also well known, and the objects of the electrostatic flocking process are also to prevent the stickiness of the glove on a user's hand skin and to smoothly attach and detach the grove. That is, the friction reduction effect obtained by the electrostatic flocking process has been useful in improving the smoothness of the operation of the contacted product, and has not been intended to increase the wear resistance of a body to be flocked itself.

On the other hand, the inventors of the present application have focused on the effects of increasing the mechanical wear resistance of the flocked layer formed by such electrostatic flocking process, and have newly conceived that the flocked layer formed by the electrostatic flocking process is applied to protect a surface of an elastic body like rubber inherently having a relative high friction coefficient and requiring repetitive expansion and contraction, more specifically, to increase the durability. Specifically, a layer in which the short fibers are densely flocked on the surface of the rubber contacts the inner surface of the externally mounted sleeve so that distal ends of the respective short fibers serve as numerous "contact points," resulting in the contact area being significantly reduced as compared with a case where the rubber surface directly contacts the inner surface of the sleeve. When the inner surface of the sleeve presses against and scrapes a surface of the elastic tube due to the expansion and contraction of the elastic tube, individual short fibers are fixed at bases thereof, while the distal ends thereof are freely inclined in all directions to be recoverable. Thus, side surfaces of the short fibers linearly contact the inner surface of the sleeve, and always move flexibly or in a "dodging manner" in all directions conforming to the inner surface of the sleeve so that the contact area between the surface of the elastic tube and the inner surface of the sleeve is reduced. Such actions enable the friction between the surface of the elastic tube and the inner surface of the sleeve to be reduced, thereby suppressing the damage and wear of the surface of the elastic tube.

As described above, in the conventional mechanical field, the electrostatic flocking process has been used to facilitate the movement of an object which contacts a member to be flocked, protect a human body, reduce the impact sound during the contact, or increase the friction force to appropriately stop the movement of the object after the contact. On the other hand, the invention of the present application is based on the reverse idea of increasing the wear resistance of the surface of the elastic tube which is expanded and contracted by the electrostatic flocking layer to protect the surface of the elastic tube from the friction with the inner surface of the sleeve which scraps through the surface of the elastic tube. As described later, as a result of the reciprocating friction test carried out by the inventors, it is recognized that the friction coefficient and the amount of the abrasive substances of the surface of the rubber on which the flocked layer in which the short fibers are flocked by the electrostatic flocking process is provided are significantly reduced as compared with the rubber surface without the flocked layer, thereby increasing the wear resistance by the flocked layer.

The invention according to claim 2 discloses an elastic tube as a driving force source of a fluid pressure actuator that is driven by supplying and discharging fluid such as air or liquid, in which a wear-resistant flocked layer is provided on an outer circumferential surface of the elastic tube, the wear-resistant flocked layer being formed by an electrostatic flocking process in which short fibers made of synthetic resin are flocked in a number of strips along an axial direction to be perpendicular to the outer circumferential surface.

Examples of an adhesive used for the electrostatic flocking process include an acrylic-based adhesive, an urethane-based adhesive, an epoxy-based adhesive, and a vinyl acetate-based adhesive, and examples of a formulation include an emulsion-type adhesive, and a solvent-type adhesive. The adhesive is not particularly limited as long as the adhesive has strong adhesion to the rubber surface, and the elasticity and flexibility according to deformable expansion and contraction of the rubber itself, but it is preferable that an acrylic emulsion-based adhesive or an urethane solvent-based adhesive, for example is used for the flocking of the short fibers made by nylon on the elastic tube made of rubber. Such an adhesive has not only strong adhesion to the rubber but also high elasticity of the adhesion layer to be formed, and exerts high stretchability according to expansion and contraction of the elastic tube. However, cracks are generated in the thin adhesion layer while the elastic tube is repeatedly expanded and contracted when there is a difference in elasticity between the rubber itself and the adhesion layer, which may eventually cause the flocked layer to be separated from the adhesion layer.

In order to prevent separation of such a flocked layer, it is effective that gaps are provided in the flocked layer on the surface of the rubber. If the adhesion layer is discontinuous, the influence of the expansion and contraction of the surface of the rubber surface on the stretches of the adhesion layers themselves is reduced, and thus cracks are unlikely to be generated. As described above, when the elastic tube is expanded with the air pressure applied thereto, the sleeve causes the elastic tube to shrink in the axial direction by changing the angle of the mesh in response to the radial expansion of the elastic tube. Therefore, the outer circumferential surface of the elastic tube is expanded in sectional view when the elastic tube is expanded in a circumferential direction, and a tensile force acts on the adhesion layer, which causes stretches of the adhesion layer, and thereby the cracks are easily generated. On the other hand, in the axial direction of the elastic tube, the tensile force acting on the adhesion layer when the elastic tube is expanded is relatively smaller than that in the circumferential direction, and thus cracks are unlikely to be generated. As illustrated in FIG. 4, the mesh of the sleeve is configured to be compressed in the axial direction when the elastic tube is expanded, and to be extended when the elastic tubed is contracted, and thus the friction between the surface of the elastic tube and the inner surface of the sleeve in the axial direction becomes larger than that in the circumferential direction. Accordingly, if the short fibers in the flocked layer are aligned and formed in a number of strips along the axial direction on the outer circumferential surface of the elastic tube, the wear resistance with respect to the friction in the axial direction can be maintained, and the cracks can be prevented from being generated in the adhesion layer by the tensile force in the circumferential direction because the short fiber strips on the flocked layer are separated through a gap from each other.

The invention according to claim 3 discloses an elastic tube as a driving force source of a fluid pressure actuator that is driven by supplying and discharging fluid such as air or liquid, in which a wear-resistant flocked layer is provided on an entire outer circumferential surface of the elastic tube, the wear-resistant flocked layer being formed by an electrostatic flocking process in which short fibers made of synthetic resin are flocked as a number of dots to be perpendicular to the outer circumferential surface.

The elastic tube in the McKibben fluid pressure actuator during driving is contracted in the axial direction at contraction and expanded in the circumferential direction, while the elastic tube is operated in a reverse direction at expansion. An expansion/contraction ratio non-linearly responds to the air pressure applied at a center of the tube and near the terminals at the both ends of the tube. As a result, each of the expansion/contraction direction of the surface of the elastic tube and the direction of the friction with the inner surface of the sleeve is different depending on a portion of the elastic tube, and thus it is desirable that the flocked layer has the durability against the expansion/contraction and the friction in all directions.

In contrast, if the short fibers in the flocked layer are densely formed as dots and distributed at equal intervals, the cracks can be prevented from being generated in the adhesion layer even when the elastic tube is expanded and contracted not only in the circumferential direction but also in all directions, thereby capable of further increasing the wear resistance of the elastic tube. Accordingly, it is preferable that the dots are arranged so that distances between a center of each dot and centers of all adjacent dots are equal to one another. Note that the size of the dot and the distance between centers of the adjacent dots can be appropriately set according to the diameter and the expansion/contraction ratio of the elastic tube, and are not limited to particular values. In order to densely provide the short fibers in the flocked layer and the gaps equally, the shape of the dot is not limited to a circular shape, and may be a square shape, or the other rotational symmetrical shape formed in a repeating mesh shape.

The inventors carried out the reciprocating friction test using test pieces of the rubber plates which were subjected to the electrostatic flocking process to verify the effect of increasing the wear resistance of the surface of the elastic tube formed by the electrostatic flocking process. The test piece used for the test was a natural rubber sheet (64 mm square, 3 mm in thickness), and short fibers made by nylon were flocked on one surface of the natural rubber sheet by the electrostatic flocking process using a simple electrostatic flocking device. As the flocking adhesive, the acrylic emulsion-based adhesive for flocking on a rubber sheet was used and was applied with a coating thickness of about 0.1 mm. A friction target of the reciprocating friction test was a PET (polyethylene terephthalate) sleeve used for the McKibben fluid pressure actuator, and the sleeve piece was cut out from the sleeve of a mesh made of PET filament yarns having a thickness of about 0.3 mm formed in a twilled shape in which three wefts and three warps aligned on a plane intersected at a sharp angle (about 35 degrees), and the aperture ratio was about 25%. In the reciprocating friction test, the reciprocating friction was added to the sleeve piece by 50 cycles in each of a parallel direction and a perpendicular direction to the axial direction of the sleeve under the test conditions of a weight: 200 g, a speed: 150 mm/minute, and one-way length: 100 mm using a surface property tester (frictional wear tester), a static friction coefficient, a dynamic friction coefficient, and an amount of wear based on a weight change of the test piece were measured, to obtain average values, and the values of the standard deviation as shown in Table 1. Note that the "dot shape" in the "flocked state" means that short fibers in the flocked layer which were formed on a surface of the test piece in circular dots of 3 mm in diameter were flocked on the entire one surface of the test piece so that the centers of the short fiber dots were spaced from one another at intervals of 6 mm. Regarding a "glass piece (for reference)" of the "friction target," the glass piece having a smooth surface was used for the reference test without using the sleeve as the friction target.

TABLE 1

| Friction target | Test piece | Flocked state | Friction direction | Static friction coefficient | Dynamic friction coefficient | Amount of wear (mg) |
|---|---|---|---|---|---|---|
| Mesh piece | Without flocked layer | | Parallel | 1.10 ± 0.05 | 0.82 ± 0.02 | 4.1 ± 0.5 |
| | | | Perpendicular | 1.08 ± 0.04 | 0.83 ± 0.02 | 4.0 ± 0.4 |
| | With floced layer | Entire surface | Parallel | 0.22 ± 0.01 | 0.42 ± 0.01 | <0.1 |
| | | | Perpendicular | 0.24 ± 0.01 | 0.51 ± 0.01 | <0.1 |
| | | Dot shape | Parallel | 0.35 ± 0.01 | 0.47 ± 0.02 | <0.1 |
| | | | Perpendicular | 0.37 ± 0.02 | 0.57 ± 0.02 | <0.1 |
| Glass piece (for refernce) | Without flocked layer | | | 1.95 ± 0.23 | 1.53 ± 0.22 | ND |
| | With floced layer | Entire surface | | 0.22 ± 0.02 | 0.22 ± 0.01 | ND |
| | | Dot shape | | 0.41 ± 0.02 | 0.45 ± 0.02 | ND |

As the test results, the test piece in which the flocked layer was provided on the entire surface showed the static friction coefficient and the dynamic friction coefficient reduced by about 80% and about 49% in the parallel direction, respectively and by about 78% and about 39% in the perpendicular direction, respectively, as compared with the test piece without the flocked layer. The amount of wear of the test piece without the flocked layer was about 4 mg, but that of the test piece with the flocked layer was reduced to 0.1 mg or less which corresponds to the measurement error value. This means that no short fibers flocked under the test conditions fell off the adhesion layer, and the friction of the rubber of the test piece could be prevented. On the other hand, when short fiber dots in the flocked layer were provided in the test piece, the friction coefficients were reduced by about 68% and about 43% in the parallel direction, and by about 66% and about 31% in the perpendicular direction, and the reduction width of the friction coefficient became smaller, but all of the amounts of wear were reduced to 0.1 mg or less. Based on the above-described test results, it could be confirmed that the friction with the sleeve was reduced by the flocked layer provided on the rubber surface, and the smoother operation of the McKibben fluid pressure actuator was expected, and the wear resistance of the elastic tube was significantly increased as well. Note that when the glass piece is regarded as the friction target, the test piece whose entire surface was provided with the flocked layer showed the static friction coefficient and the dynamic friction coefficient reduced by about 89% and about 86%, respectively and the test piece on which short fiber dots in the flocked layer were provided showed the static friction coefficient and the dynamic friction coefficient reduced by about 79% and about 71%, respectively, as compared with the test piece without the flocked layer. Alternatively, the standard deviation of the friction coefficient is large when the test piece without the flocked layer was tested because it is considered that the surface of the rubber plate having unevenness due to the manufacturing process directly contacts the glass piece, thereby incorporating variations in the surface conditions for each test piece.

The invention according to claim 4 discloses a fluid pressure actuator having the elastic tube according to any one of claims 1 to 3 as a driving force source.

According to the present invention, the damage and wear of the elastic tube due to the friction between the outer circumferential surface of the elastic tube and the inner surface of the sleeve as the constraints of the durability of the fluid pressure actuator, more specifically, the McKibben actuator can be effectively reduced without particularly changing the design of the elastic tube itself. As a result, the present invention contributes to the promotion of the use of such an actuator by increasing the durability of the elastic tube as a consumable member at low cost, and reducing the burden of the maintenance of the actuator.

DETAILED DESCRIPTION OF EMBODIMENTS

First Embodiment

Figure 1:
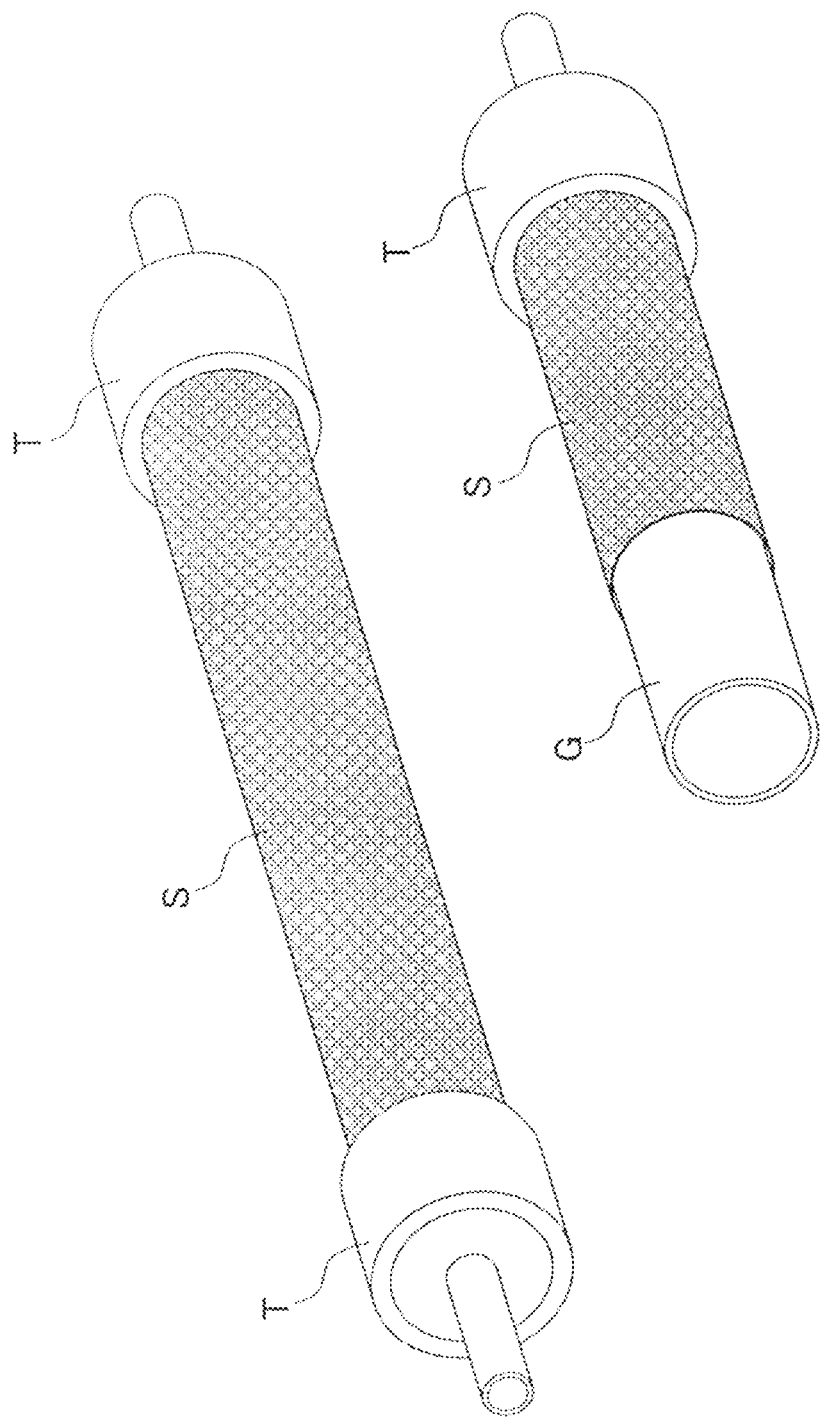
FIG. 1 is a perspective view illustrating a structure of a general McKibben fluid pressure actuator.
Figure 2:
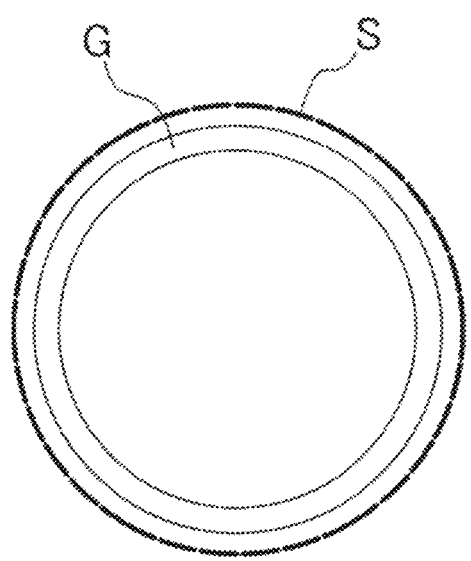
FIG. 2 is a cross-sectional view illustrating the general McKibben fluid pressure actuator.
Figure 3:
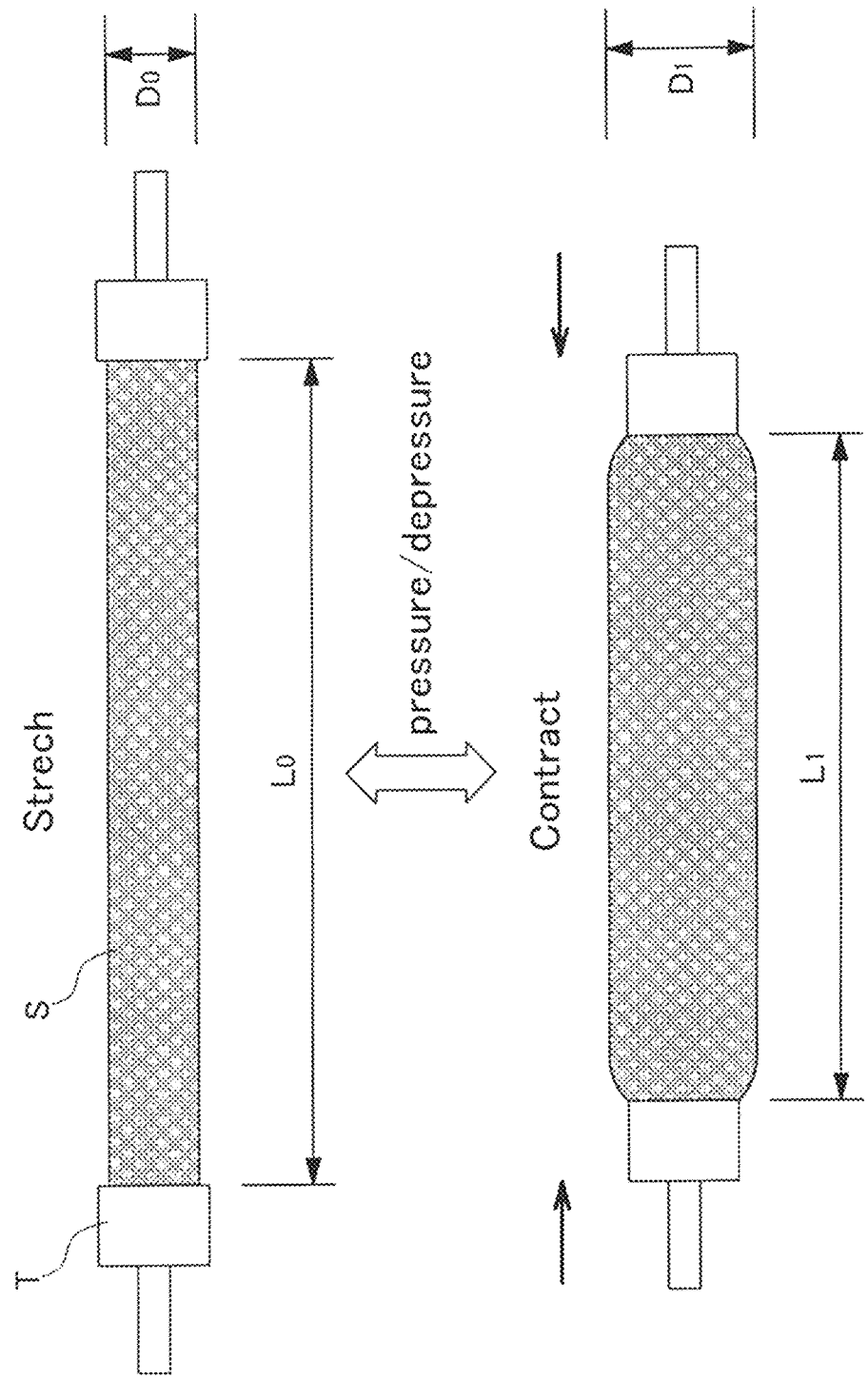
FIG. 3 is a diagram illustrating operation of the general McKibben fluid pressure actuator.
Figure 4:
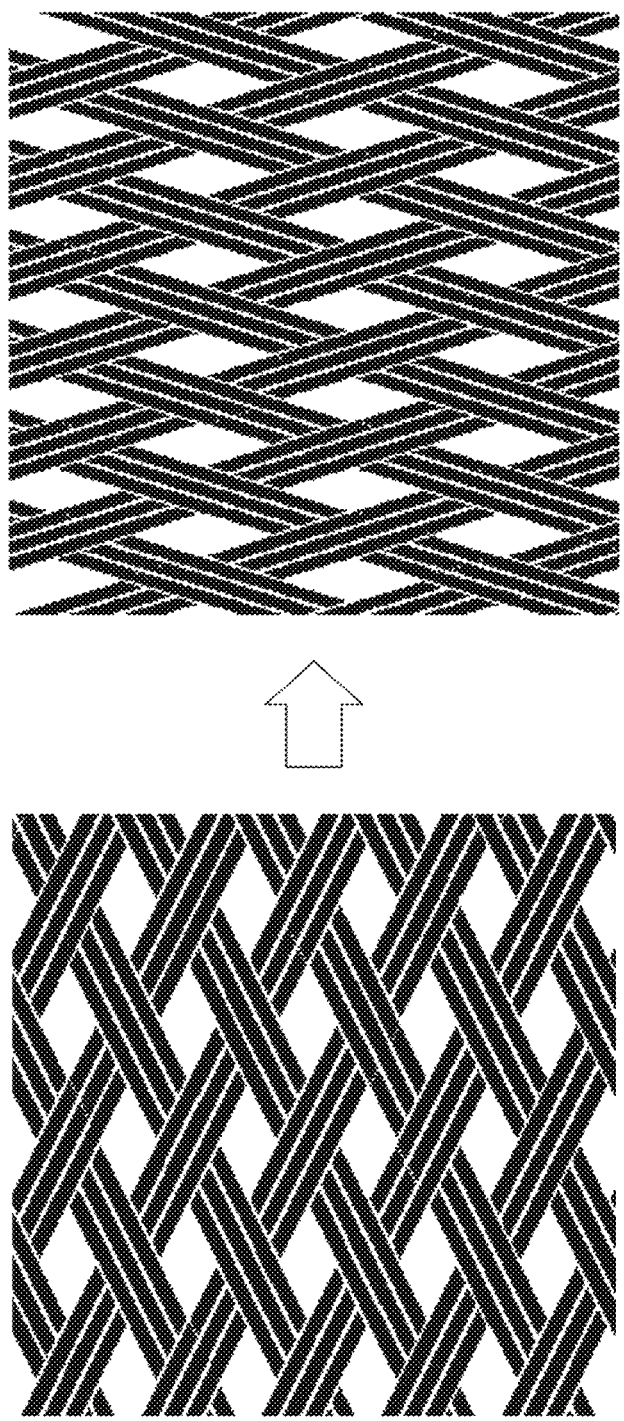
FIG. 4 is an enlarged diagram illustrating a sleeve of the general McKibben fluid pressure actuator.
Figure 5:
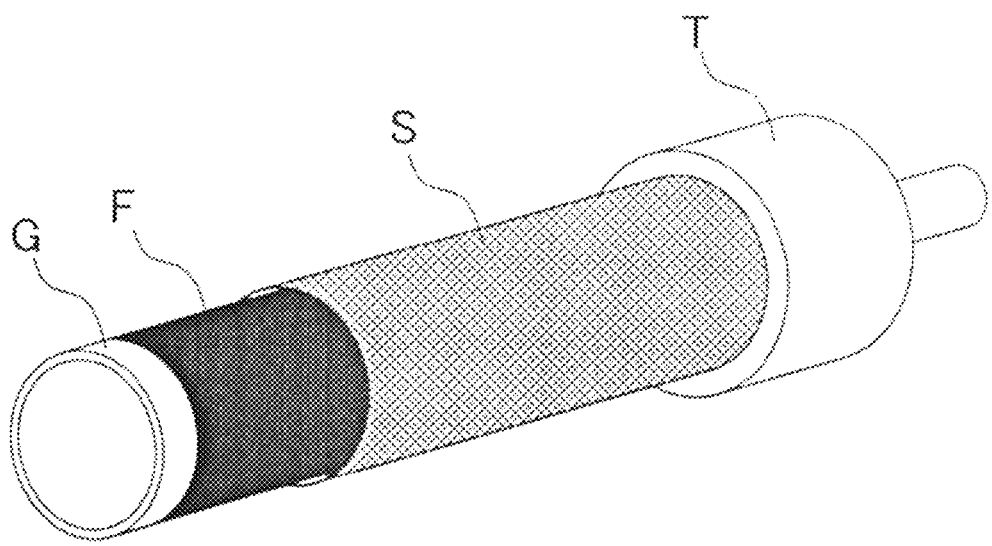
FIG. 5 is a perspective view illustrating a structure of a fluid pressure actuator to which an elastic tube according to a first embodiment is applied.
Figure 6:
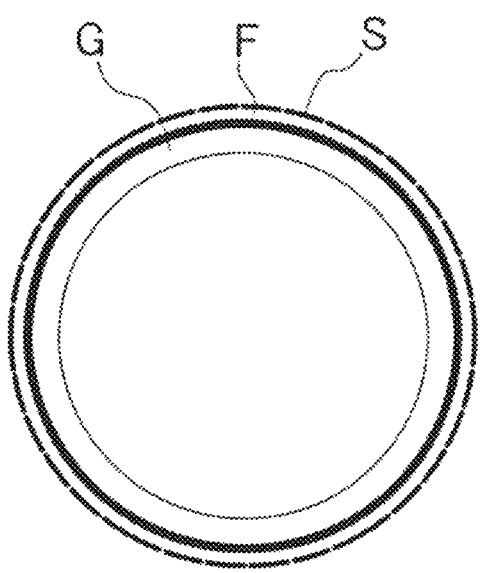
FIG. 6 is a cross-sectional view illustrating the fluid pressure actuator to which the elastic tube according to the first embodiment is applied.
Figure 7A:
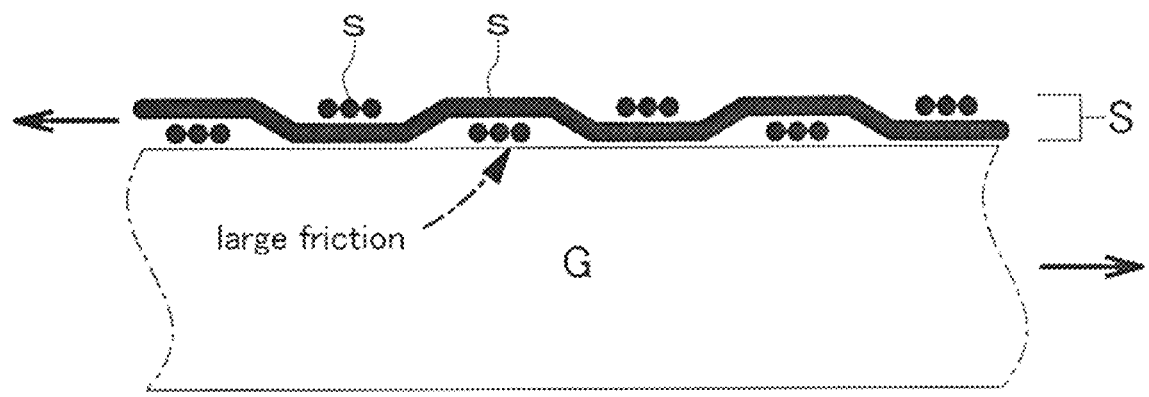
FIGS. 7A, 7B, and 7C are enlarged schematic diagrams each illustrating a state in which the rubber tube contacts the sleeve.

Hereinafter, an embodiment of the present invention will be described based on the drawings. FIG. 5 is a perspective view illustrating an internal structure of a fluid pressure actuator to which an elastic tube according to a first embodiment of the present invention (a rubber tube G made of urethane rubber in the embodiment) is applied. FIG. 6 is a cross-sectional view of the same. The rubber tube G has a flocked layer F formed on an outer circumferential surface thereof, the flocked layer F being formed by an electrostatic flocking process in which short fibers f made of nylon are flocked, and the rubber tube G is housed in a sleeve S. As illustrated in a schematic diagram of FIG. 7(a), the sleeve S is a mesh made of PET filament yarns formed in a twilled shape in which three wefts and three warps aligned on a plane intersect at a sharp angle. If the rubber tube G having no flocked layer F is expanded with a pressure, an inner surface of the sleeve S having uneven portions directly presses against and scrapes a surface of the rubber tube G, and the friction between the sleeve S and the rubber tube G may cause wear and damage of the rubber tube G.

Figure 7B:
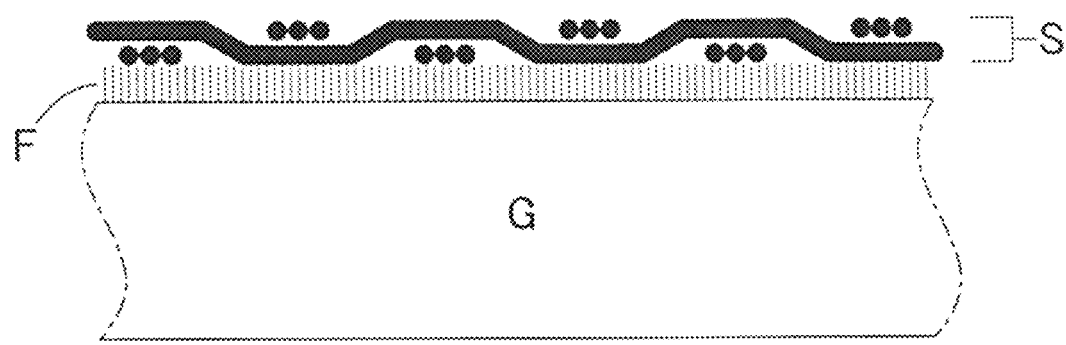
Figure 7C:
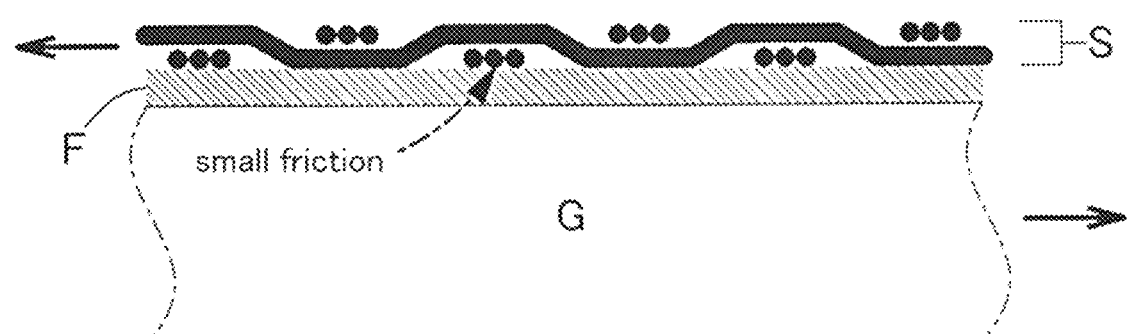

On the other hand, in the first embodiment, as illustrated in a schematic diagram of FIG. 7(b), distal ends of the short fibers f contact the inner surface of the sleeve S as numerous "contact points," thereby reducing the friction. As illustrated in a schematic diagram of FIG. 7(c), individual short fibers f are fixed at base ends thereof, while the distal ends are freely inclined in all directions to be recoverable. Thus, side surfaces of the short fibers f linearly contact the inner surface of the sleeve S, and always move flexibly or in a "dodging manner" in all directions so that the friction is reduced, thereby suppressing the damage and wear of the surface of the rubber tube G. Furthermore, when the short fibers f are sufficiently densely flocked, the short fibers f are supported by one another, and are not easily inclined even when the short fibers f are pressed by the inner surface of the sleeve S, resulting in the flocked layer F serving as a buffer layer between the rubber tube G and the sleeve S.

A length and a thickness of the short fiber f forming the flocked layer F are not limited to particular values as long as the sufficient flocking density is ensured, but it is preferable for the sleeve (filament yarn s having a diameter of about 0.3 mm, an aperture ratio at expansion of about 25%) used for a general McKibben fluid pressure actuator that the short fibers f having a length of about 0.5 mm and a diameter of about 20 μm are flocked at a density of at least 5,000 fibers per square centimeter. This is because, since the mesh of the sleeve S is repeatedly expanded or contracted by the operation of the actuator, if the short fibers f are too long, the short fibers f may be inserted into the mesh at expansion and caught by the mesh at contraction, thereby being withdrawn from the flocked layer F, and if the flocking density is coarse, the filament yarns s bite into the flocked layer F, thereby causing high friction coefficient and impairing the wear resistance.

Note that the flocked layer F in which the short fibers f having different lengths are mixed at a uniform mixed ratio can be formed within the skill of the art, and is actually formed. In this case, since longer short fibers which are inclined by an external pressure applied to the surface of the flocked layer F are supported by shorter short fibers, it is known that the restoring force of the entire flocked layer F is increased, and the wear resistance of the flocked layer F can be further increased by adopting such a configuration.

Second Embodiment

Figure 8:
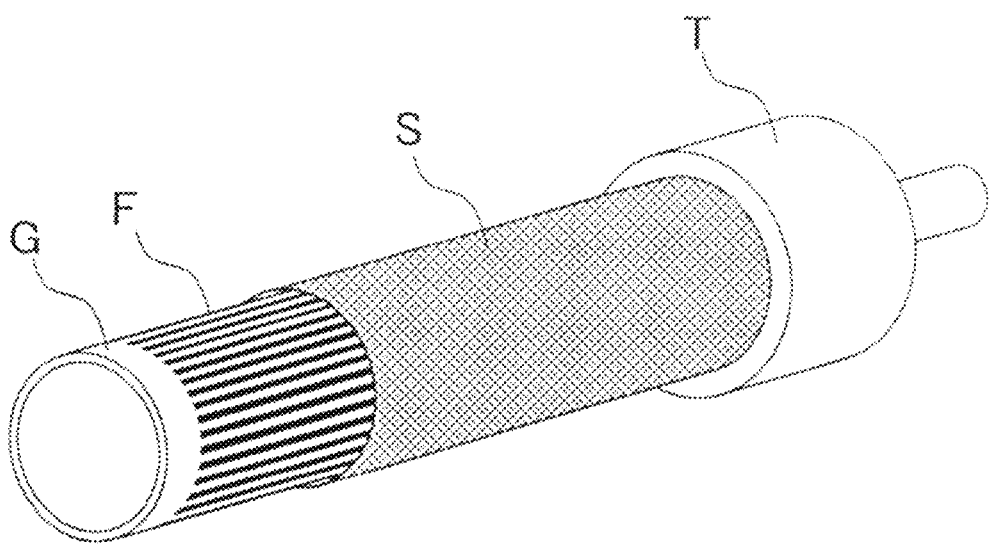
FIG. 8 is a perspective view illustrating a structure of a fluid pressure actuator to which an elastic tube according to a second embodiment is applied.
Figure 9:
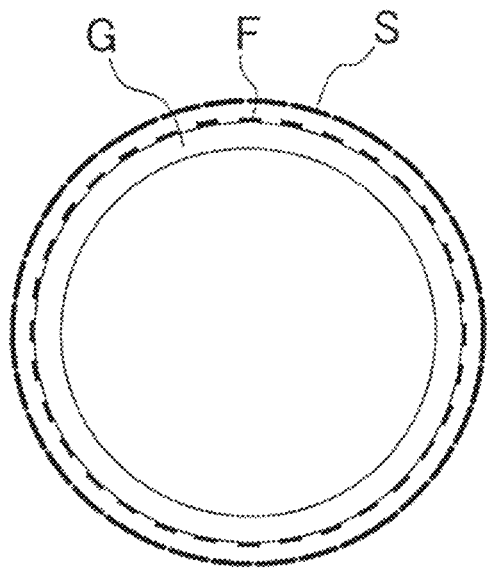
FIG. 9 is a cross-sectional view illustrating the fluid pressure actuator to which the elastic tube according to the second embodiment is applied.
Figure 10:
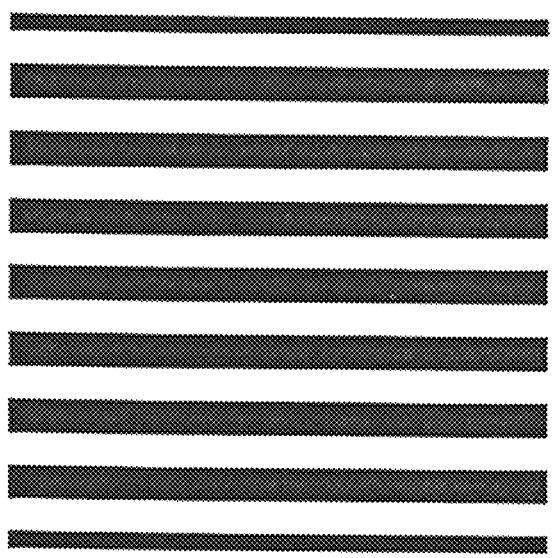
FIG. 10 is an enlarged schematic diagram illustrating a surface of the rubber tube according to the second embodiment.

FIG. 8 is a perspective view illustrating an internal structure of a fluid pressure actuator to which a rubber tube G according to a second embodiment of the present invention is applied. FIG. 9 is a cross-sectional view of the same. In the present embodiment, a flocked layer F on a surface of the rubber tube G is formed in which short fibers f are formed in strips along an axial direction as illustrated in an enlarged diagram of FIG. 10.

Figure 11:
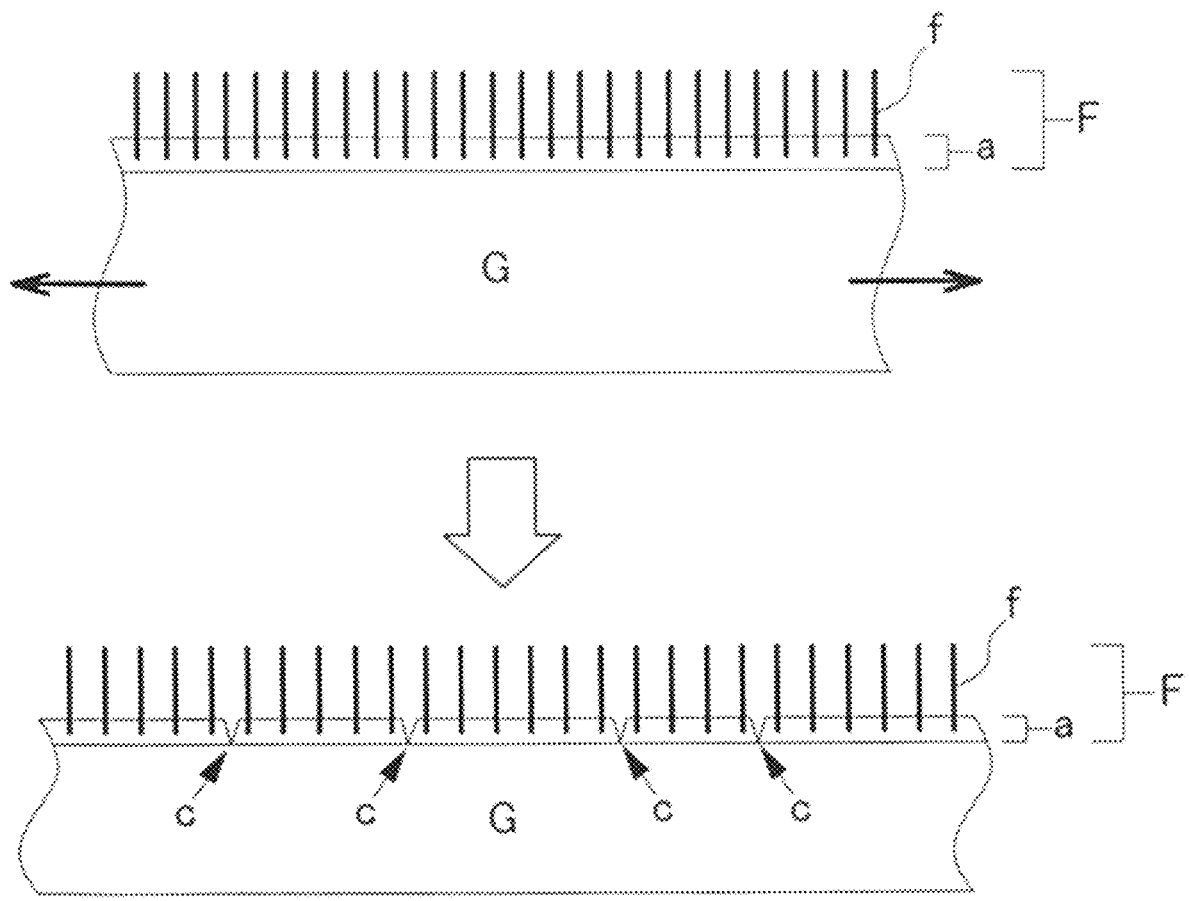
FIG. 11 is a schematic diagram illustrating generation of cracks in the surface of the rubber tube.

As illustrated in a schematic diagram of FIG. 11, the flocked layer F includes an adhesion layer a to bond and flock short fibers f on the surface of the rubber tube G with an adhesive, but if there is a difference in elasticity between the rubber and the adhesion layer even when an acrylic emulsion-based adhesive or an urethane solvent-based adhesive exerting high stretchability according to expansion and contraction of the rubber tube G is used, cracks c are generated in the thin adhesion layer a while the rubber tube G is repeatedly expanded and contracted when the actuator is operated, which may eventually cause the flocked layer F to be separated from the adhesion layer a.

Figure 12:
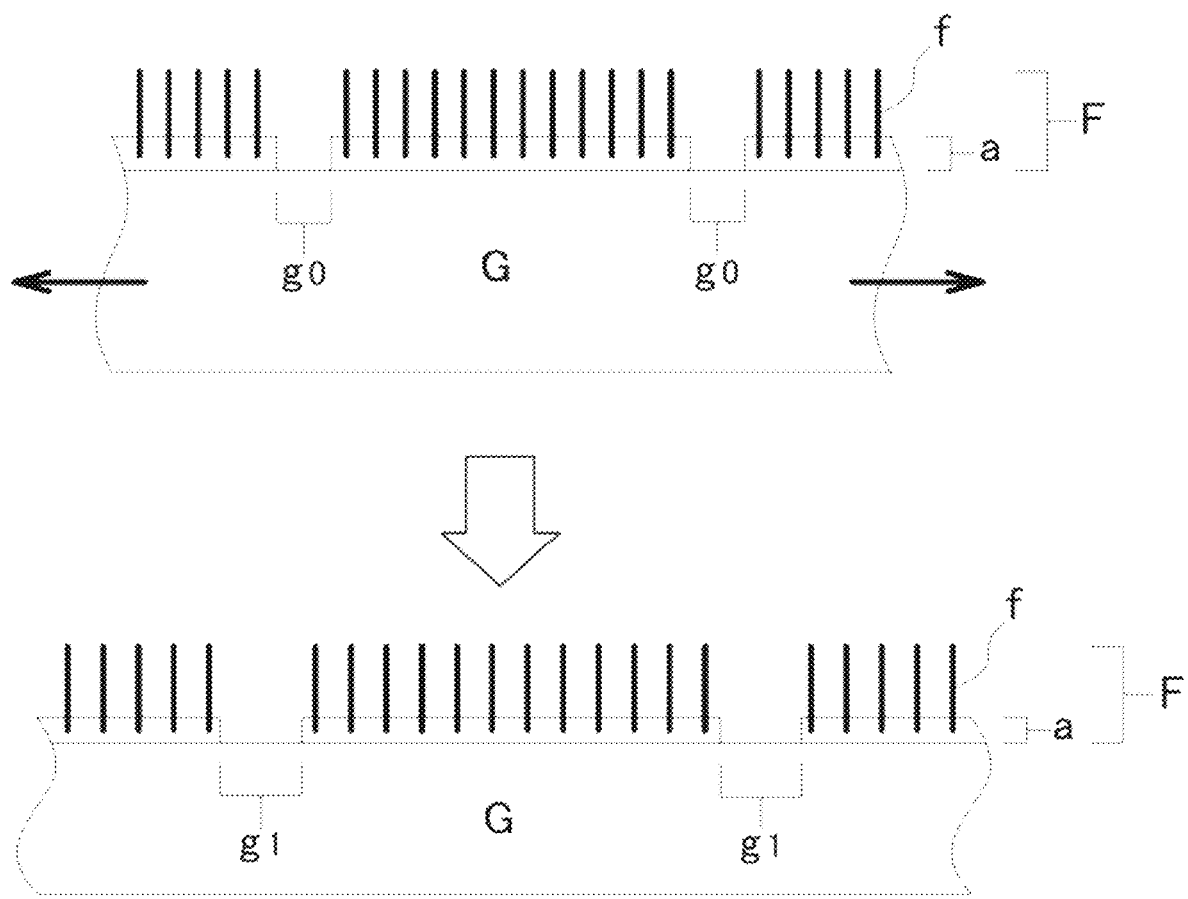
FIG. 12 is a schematic diagram illustrating the surface of rubber tube according to the second embodiment.

In the present embodiment, as illustrated in an enlarged diagram of FIG. 12, the short fibers f in the flocked layer F are formed at intervals g in strips, and are discontinuous from one another, thereby reducing the influence of the expansion and contraction of the surface of the rubber tube G on the stretches of the adhesion layers a themselves, and thus cracks are unlikely to be generated. The friction between the flocked layer F and the inner surface of the sleeve S is mainly generated in a reciprocating direction along the axis of the rubber tube G, but the friction is relatively small in the circumferential direction, and thus the short fibers f in the flocked layer F are formed in strips on the outer circumferential surface of the rubber tube along the axial direction, thereby capable of maintaining the wear resistance to the axial friction while preventing cracks from being generated by a tensile force in a circumferential direction applied to the adhesion layers a, and also increasing the durability of the flocked layer F. Note that the width of the short fiber strip of the flocked layer F and the interval between the short fiber strips are not limited to particular values, but when they are applied to the sleeve S used for the above-described general McKibben fluid pressure actuator, short fiber strips having a width of about 3 mm in the flocked layer F are preferably provided at intervals of about 1 mm from each other.

Third Embodiment

Figure 13:
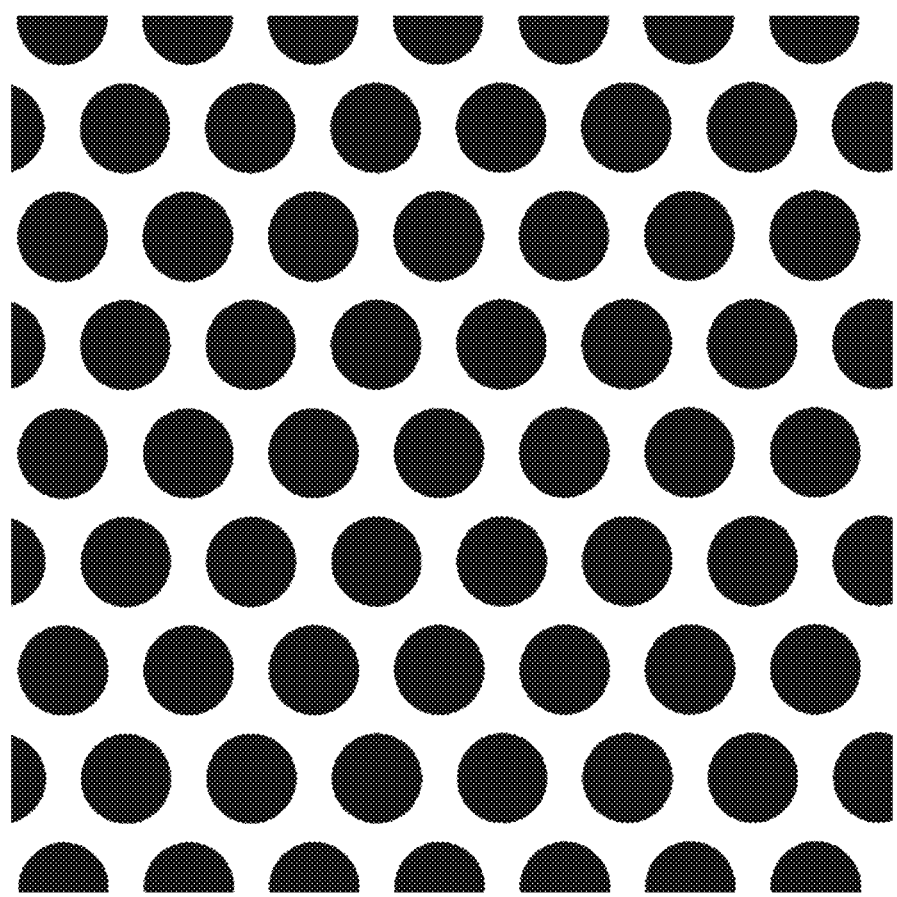
FIG. 13 is an enlarged schematic diagram illustrating a surface of a rubber tube according to a third embodiment.
Figure 14:
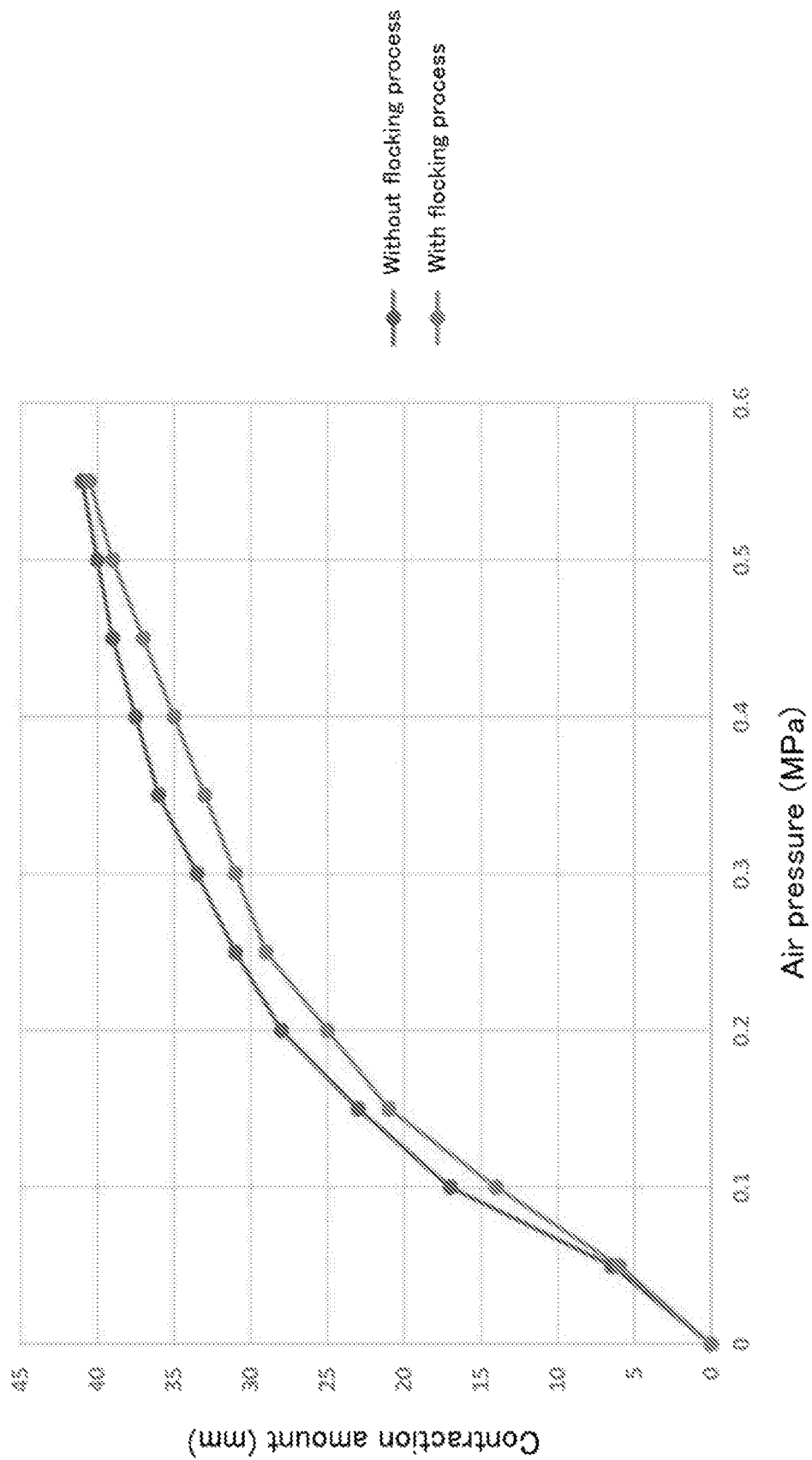
FIG. 14 is a graph showing results of a contraction amount of the fluid pressure actuator measured with respect to a change in air pressure applied to the rubber tube G presence and absence of the flocked layer F.
Figure 15:
Figure 16:
Figure 17:

In a third embodiment of the present invention, short fibers f in a flocked layer F are formed as circular dots on a surface of a rubber tube G as illustrated in an enlarged diagram of FIG. 13, and the dots are arranged so that distances between a center of each dot and centers of all adjacent dots are equal to one another, and the other configurations are the same as those in the second embodiment. In such a configuration, since in the flocked layer F, adhesion layers a in the flocked layer F are spaced from one another in all directions, even when the surface of the rubber tube G is non-linearly contracted at an expansion/contraction ratio which differs depending on a portion of the rubber tube G when the actuator is operated, it is possible to reduce the possibility that cracks c are generated in the adhesion layers a and increase the durability of the flocked layer F as compared with that in the second embodiment.

(Results of Durability Test on Fluid Pressure Actuator to which the First Embodiment is Applied)

The inventors carried out the durability test on a McKibben fluid pressure actuator device to which a rubber tube according to the first embodiment of the present invention was actually applied, the rubber tube being already subjected to the electrostatic flocking process, in order to verify the effects of the present invention. The specifications of the rubber tube G used for the test, the conditions of the electrostatic flocking process, and the specifications of the fluid pressure actuator, and the conditions of the durability test are shown in Table 2.

TABLE 2

| | | Remarks |
|---|---|---|
| 1) Specifications of rubber tube | | |
| Component | Urethane | |
| Thickness | 0.4 mm | |
| Outer diameter | 30 mm | |
| 2) Conditions of electrostatic flocking process | | |
| Pile | Component | Nylon |
| | Length | 0.5 mm |
| | Thickness | 19 um |
| Adhesive | Product name | F-810 manufacturede by KOBAYASHI & Co., LTD. |
| | Conponent | Polyurethane toluene solution (solbent type) |
| Application of adhesive | Method | Brush coating |
| | Thickness | About 0.1 mm |
| Flocking method | Procuct name | Customized product for rubber tube using simple electrostatic flocking device manufactured by GREEN TECHNO Co., Ltd. |

TABLE 2-continued

| | | |
|---|---|---|
| | Type | Up method |
| | Electrode application | −30 kV |
| | Sample | Rotate grounded rubber tube at speed of 1 rotaion per 3 seconds |
| | Application time | Repeat a cycle of application for 6 seconds and non-application for 6 seconds 4 times |
| | Numerical value | Remarks |
| | | 3) Specification of fluid pressure actuator |
| Length | About 200 mm | Length of moving part in fluid pressure actuator |
| Outer diameter | About 32 mm | Outer diameter larger than that of internal tube to include thickness of mesh sleeve |
| | | 4) Conditions of durability test |
| Weight | 20 kg | |
| Pressure application | 0.5 MPa | |
| Cycle | 3 seconds | Repeat a cycle of pressure application for 1.5 seconds and discharge for 1.5 seconds |
| Length change | About 40 mm | Length was changed from 200 mm to 160 mm at pressure application. Length change does not depend on presence or absence of electrostatic flocking process. |
| Outer diameter change | About 16 mm | Outere diameter was changed from 32 mm to 48 mm at pressure application. Outer diameter change does noto depend on presence or absence of electrostatic flocking process. |

*1 A change in lengths of the three fluid pressure actuators which were not subjected to the electrostatic flockin process was 40 ± 2 mm, and the change in lengths of the fluid pressure actuator which were subjected to the electrostatic flocking process also was within this range.
*2 A base was set so that the fluid pressure actuator during pressure to carry out the test according to the actual usage at the use site.
*3 A change in outer diameters of the three fluid pressure actuators which were not subjected to the electrostatic flocking process was 16 ± 1 mm, and the change in outer diameters of the fluid pressure actuators which were subjected to the electrostatic flocking process also was within this range.

The durability test was carried out using three rubber tubes G that were subjected to the electrostatic flocking process and three rubber tubes G (control group) that were not subjected to the electrostatic flocking process. In the durability test method, an air pressure of 0.5 MPa was applied in a 3 second cycle (pressure application for 1.5 seconds and pressure discharge for 1.5 seconds) using a pressurizing device connected to an air compressor in a state in which an expansion load was applied by a weight of 20 kg to the rubber tube G, and the durability test was repeated until the air leaked out of the rubber tube G.

The results of the durability test are shown in Table 3. In each of the fluid pressure actuators using three rubber tubes G of the control group, pinholes were generated in the rubber tube G, resulting in generation of air leakage before 50,000 cycles of the durability tests, while in each of the fluid pressure actuators using three rubber tubes G which were subjected to the electrostatic flocking process, no air leakage was generated after 1,000,000 cycles or more of the durability tests, and the effect of increasing the durability by the flocked layer F could be clearly verified. It is understood that a pattern of the inner surface of the sleeve S was transferred to the surface of the rubber tube G which was not subjected to the electrostatic flocking process, due to press-contact with the sleeve S at contraction (that is when the rubber tube G was expanded), and a high stress was applied to the surface of the rubber tube G. However, in the rubber tube G which was subjected to the electrostatic flocking process, a slight wear was observed in the flocked layer F after 1,000,000 cycles of the durability tests, but the falling off (coming off) of the short fibers f and the folding over of the flocked layer F were not clearly observed.

TABLE 3

Results of durability test

| Sample NO. | Electrostatic flocking process | Dufable number of cycles | Damaged state | Remarks |
|---|---|---|---|---|
| 1 | No | 32,000 cycles | Air leakage from pinholes | Pinhole was generated at the position of about 15 mm from end of moving part |
| 2 | | 37,000 cycles | The same as above | The same as above |
| 3 | | 44,000 cycles | The same as above | Pinhole was generated approximately in a center of the rubber tube |
| 4 | Yes | 1,000,000 cycles or more | No damage after 1,000,000 cycles | No air leakage and no folding over of the electrostatic flocked layer after 1,000,000 cycles |
| 5 | | 1,000,000 cycles or more | The same as above | The same as above |
| 6 | | 1,000,000 cycles or more | The same as above | The same as above |

*4, *5 A pihole was generated in a mark of the mesh. The pinhole was considered to be generated because the scratch produced due to the friction with the mesh was deep by repetitions of the expansions and contraction of the rubber tube.

Figure 18:
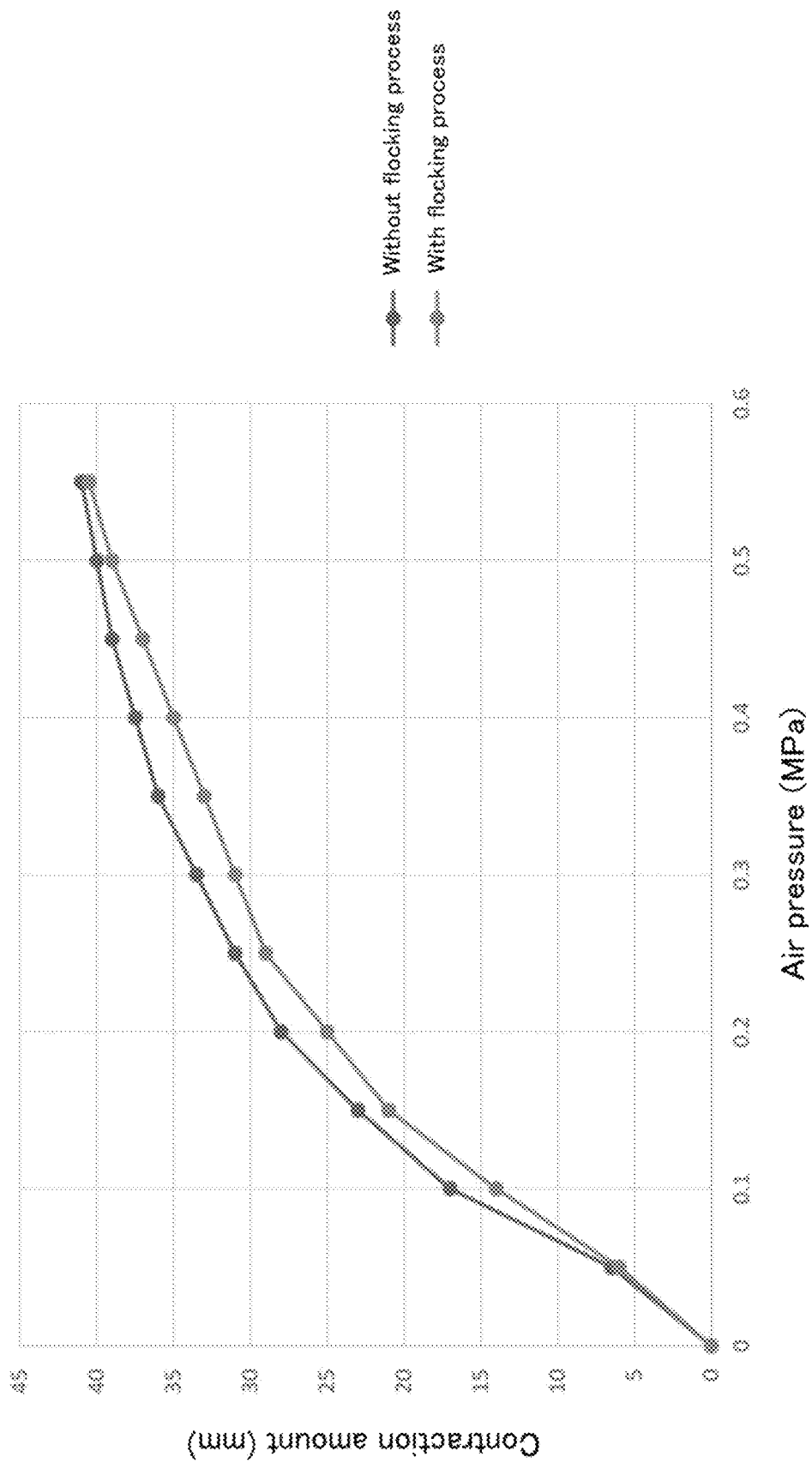

FIG. 18 is a graph showing results of a contraction amount of the fluid pressure actuator measured with respect to a change in air pressure applied to the rubber tube G presence and absence of the flocked layer F to compare between presence and absence of the flocked layer F. An expansion amount of the fluid pressure actuator with the flocked layer F was smaller than that of the fluid pressure actuator without the flocked layer F, but the difference in the expansion amount was very small, and the expansion amounts were almost the same when a pressure of 0.5 MPa or more is applied. Accordingly, providing the flocked layer F to the rubber tube G had substantially no effect on the expansion/contraction characteristics of the fluid pressure actuator.

A specific configuration of the elastic tube according to the present invention has been described, but the present invention is not limited to the aforementioned embodiments. The embodiments may be modified or changed without departing from a technical scope of the present invention, and they naturally belong to the technical scope of the present invention.

INDUSTRIAL APPLICABILITY

The present invention can be applied to an elastic tube serving as a driver of a fluid pressure actuator, more specifically, a McKibben fluid pressure actuator, and an actuator using the same, and is also effective in applications to mechanical devices and equipment using such an actuator, more specifically, a powered exoskeleton for operation and nursing care (human wearable robot), a robot artificial arm, and a robot artificial leg that operate with a relatively small required power and a constantly high frequency, and require the reduction of the burden of maintenance. The present invention contributes to the promotion of the use of such equipment by increasing the durability of the elastic tube as a consumable member at low cost, and reducing the burden of the maintenance of the actuator.

DESCRIPTION OF SYMBOLS a Adhesion layer
D Diameter of fluid pressure actuator
F Flocked layer
f Short fibers
G Elastic tube (rubber tube)
g Interval between short fibers f in flocked layer F
L Length of fluid pressure actuator
S Sleeve
s Filament
T Terminal

What is claimed is:

1. An elastic tube device for a driving force source of a fluid pressure actuator that is driven by supplying and discharging fluid including air or liquid, comprising:
    an elastic tube made of an elastic material; and
    an electrostatic flocking layer provided on an entire outer circumferential surface of the elastic tube, the electrostatic flocking layer having short fibers made of synthetic resin, the short fibers of the electrostatic flocking layer being electrostatically flocked to be perpendicular to the outer circumferential surface, the short fibers each having a length of approximately 0.5 mm and a diameter of approximately 20 µm, and the electrostatic flocking layer having a fiber density of at least 5,000 fibers per square centimeter.

2. A fluid pressure actuator having the elastic tube device according to claim 1 as a driving force source.

3. The elastic tube device according to claim 1, wherein the short fibers of the electrostatic flocking layer form a dot pattern in which a plurality of dots formed by the short fibers and a remaining portion that is free of the short fibers are disposed, the remaining portion being configured to reduce tension and/or expansion force in a circumferential direction of the elastic tube and in a direction parallel to an axial direction of the elastic tube.

4. A fluid pressure actuator having the elastic tube device according to claim 3 as a driving force source.

5. The elastic tube device according to claim 3, wherein the short fibers of the electrostatic flocking layer are electrostatically flocked to be perpendicular to the outer circumferential surface so that a size of a contact area between an inner surface of a sleeve and the short fibers of the electrostatic flocking layer to be covered by the sleeve is smaller than a size of the outer circumferential surface of the elastic tube, and
    one end of each of the short fibers is fixed to the electrostatic flocking layer, and an other end opposite to the one end is freely and recoverably inclined in any direction for increasing wear resistance.

6. The elastic tube device according to claim 3, wherein a distance between centers of each of two adjacent dot patterns is the same.

7. The elastic tube device according to claim 1, wherein the electrostatic flocking layer further includes a plurality of long fibers each having a length longer than the length of each of the short fibers.

8. An elastic tube device for a driving force source of a fluid pressure actuator that is driven by supplying and discharging fluid including air or liquid, comprising:
    an elastic tube made of an elastic martial; and
    an electrostatic flocking layer provided on an outer circumferential surface of the elastic tube, the electrostatic flocking layer having short fibers made of synthetic, the short fibers of the electrostatic flocking layer being electrostatically flocked to be perpendicular to the outer circumferential surface, and forming a strip pattern in which a plurality of first stripes formed by the short fibers and a plurality of second stripes being free of the short fibers are alternately disposed, extending in directions parallel to an axial direction of the elastic tube, the first stripes each having a width of approximately 3 mm, the second stripes each having a width of approximately 1 mm.

9. A fluid pressure actuator having the elastic tube device according to claim 8 as a driving force source.

10. The elastic tube device according to claim 8, wherein the short fibers of the electrostatic flocking layer are electrostatically flocked to be perpendicular to the outer circumferential surface so that a size of a contact area between an inner surface of a sleeve and the short fibers of the electrostatic flocking layer to be covered by the sleeve is smaller than a size of the outer circumferential surface of the elastic tube, and
    one end of each of the short fibers is fixed to the electrostatic flocking layer, and an other end opposite to the one end is freely and recoverably inclined in any direction for increasing wear resistance.

* * * * *